United States Patent Office 3,127,395
Patented Mar. 31, 1964

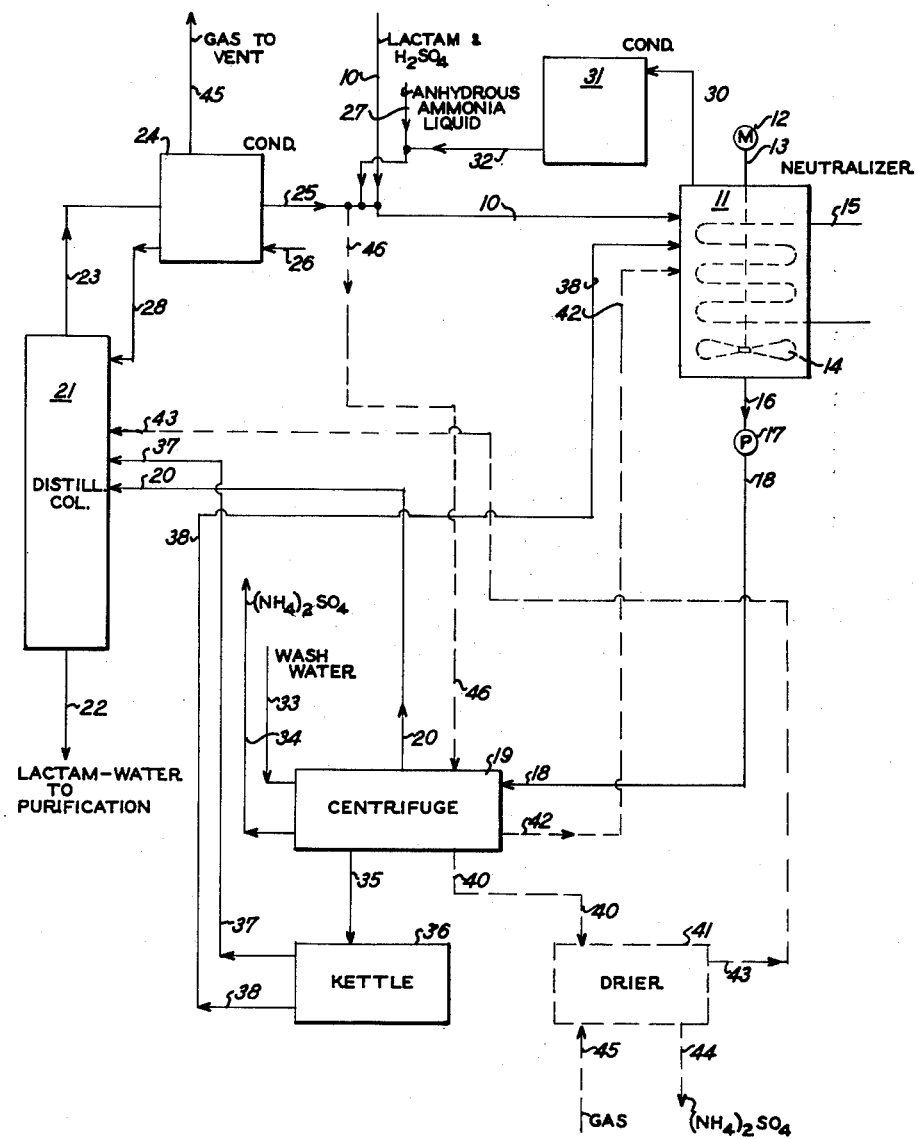

3,127,395
PROCESS OF SEPARATING LACTAMS FROM BECKMANN REARRANGEMENT REACTION MIXTURE
Ralph Landau, Northport, John White Colton, Pelham Manor, Westchester, and Martin Barry Sherwin, Jackson Heights, N.Y., assignors to Halcon International, Inc., a corporation of Delaware
Filed Mar. 7, 1962, Ser. No. 178,187
10 Claims. (Cl. 260—239.3)

This invention rates to processes for the recovery of a lactam from a mixture thereof with concentrated sulfuric acid, more particularly to such processes for the recovery of caprolactam from such a mixture by neutralization of the sulfuric acid with ammonia in the presence of excess liquid ammonia, and especially to such processes wherein concentrations are regulated so that the reaction mixture forms a solid ammonium sulfate phase and a liquid phase which is predominantly ammonia and caprolactam, separating the solid and the liquid phases and separating the lactam from the ammonia, the ammonia being recycled to the neutralization reaction step.

In a known process for the preparation of a lactam such as caprolactam, the corresponding ketoxime is rearranged in the presence of concentrated sulfuric acid at about 80° to 130° C. to give a mixture of the latter acid with lactam. The lactam may be recovered by substantial neutralization of the reaction mixture with aqueous ammonia followed by separating an aqueous lactam phase from an aqueous ammonium sulfate phase. The latter may be concentrated in order to recover solid ammonium sulfate; and it may be desirable to subject it to benzene extraction to recover the lactam therein. However, this is undesirable from the economic view-point due to the high heat costs and also the complexity of the procedure. The art is confronted by the problem of providing a more efficient process for recovering lactams.

The discoveries associated with the invention and relating to the solution of the above problems, and the objects achieved in accordance with the invention as set forth herein include the provision of:

A process for recovering a lactam from a mixture thereof with concentrated sulfuric acid which comprises treating the mixture with ammonia in excess, separating from the resulting mixture a solid ammonium sulfate phase and a lactam rich liquid phase, separating the lactam from ammonia in the latter and recycling the ammonia to the neutralization step;

Such a process wherein the reaction temperature is controlled by boiling ammonia from the reaction mixture;

Such a process wherein the lactam is caprolactam and the concentrations are such that the liquid phase is of low viscosity;

Such a process wherein the initial lactam is mixed with 100% sulfuric acid;

Such a process wherein the solid ammonium sulfate is stripped of ammonia and then given a wash with fresh water or with ammonia whereby the lactam content is brought within the maximum of 0.5% (at least a part of the wash liquor being recycled);

Such a process wherein the amount of recycled ammonia is at least 2 times that required to neutralize the acid;

Such a process wherein the recycled ammonia is about 7 times the fresh feed required to neutralize the acid;

Such a process wherein the feed mixture contains 5% oleum;

And other objects which will be apparent as details or embodiments of the invention are set forth hereinafter.

The accompanying drawing is a schematic flow diagram of a preferred embodiment of the invention.

In order to indicate still more fully the nature of the present invention the following examples of typical procedures are set forth in which parts and percents mean parts and percents by weights, respectively unless otherwise indicated, it being understood that these examples are presented as illustrative only and they are not intended to limit the scope of the invention.

*Example 1*

Referring to the drawing, anhydrous ammonia (1260 lbs./hr.) is introduced via lines 27 and 25 (together with recycled ammonia (8500 lbs./hr.)) into line 10 wherein it is mixed with a mixture of caprolactam (2650 lbs./hr.) and 100% sulfuric acid (3630 lbs./hr.) and the resulting mixture is passed into neutralizer 11, wherein it is reacted at about 50° C. and substantially neutralized with agitation. The neutralizer is equipped with agitation means such as a motor 12, shaft 13, and agitator blades 14. The neutralizer may also be provided with a cooling coil through which cooling water is passed via line 15, to maintain the desired temperature. Also (or alternatively) the temperature may be controlled by regulating the pressure so that ammonia boils at the desired temperature, the resulting vapor being removed via line 30 and passed to water cooled condenser 31 and liquified and refluxed or recycled via line 32. The ratio of recycled ammonia to fresh feed is about 7 to 1.

The resulting mixture is passed via line 16, pump 17 and line 18 to centrifuge or separator 19. The solid ammonium sulfate phase is separated therein. The solid ammonium sulfate may be given a wash with the feed ammonia passed via line 46 into the centrifuge 19; and then the solid is removed via line 40. It may be dried and marketed for use as fertilizer. The wash liquor is recycled via line 42 to neutralizer 11. The solid may be dried in (vibrating) drier 41 by indirect steam heat (heater not shown) and an inert gas passed in via line 45. The vapor and gas pass via line 43 to column 21. The solid is withdrawn via line 44 (about 4890 lbs./hr.)

Alternatively the solid may be washed with water passed in via line 33. The solid is removed via line 34 and dried in known manner. The wash liquor is passed via line 35 to (Dopp) kettle 36 and heated indirectly (with steam). The vapors pass via line 37 to column 21. The residual liquor is recycled via line 38 to neutralizer 11.

The liquid first separated in centrifuge 19 is passed via line 20 to column 21 from which lactam plus water bottoms is removed via line 22 and purified in known manner. Steam is introduced into the column via line 48. All the free water in the system is recovered via line 22. The overhead is ammonia passed via line 23 to condenser 24. If inert gas is used, it is vented via line 45. The condensate is passed via line 28 as reflux to the column and via line 25 as recycle to the neutralizer 11. Cooling water is passed through the cooler 24 via line 26.

Only a very small proportion of lactam remains with the sulfate, 0.5% or less. A small amount of lactam is recycled with the feed ammonia if ammonia is used as wash. The feed by-passes the centrifuge if no ammonia wash is used.

The process avoids such costly and undesirable procedures as benzene extraction. The lactam is recovered in good yield and is substantially free of ammonium sulfate; it may be purified readily in known manner.

This process avoids costly evaporation of water to form solid ammonium sulfate; also, it avoids high temperature and heat transfer difficulties due to the high viscosities which would be involved therein.

Example 2

The above procedure is repeated, except that the feed contains about 5% oleum, and similar results are obtained. Some water is consumed in neutralizing the oleum, and it may be added with the feed.

Comparable results to the foregoing are achieved with various modifications thereof, including the following. Any lactam plus sulfuric acid mixture may be processed in accordance with the invention. The ammonium sulfate forms a solid phase and the liquid material is a lactam rich phase containing ammonia. The lactams obtained from oximes of 6 to 11 carbon atoms are preferred. Examples of such lactams and the related oximes are caprolactam and cyclohexanone oxime, oenantholactam and cycloheptanone oxime, omega-aminooctylic acid lactam and cyclooctanone oxime, omega-aminononylic acid lactam and cyclononanone oxime, omega-amino-decylic acid lactam and cyclodecanone oxime, omega-aminoundecyclic acid lactam and cycloundecanone oxime.

The amount of excess ammonia is at least about 2 and preferably at least 5 times the ammonia equivalent weight in the feed. The upper limit is that which is uneconomic.

The feed streams and the recycle stream may be fed directly to the neutralizer, if desired. Any stream or mixture may be pre-cooled, if desired, before it enters the neutralizer. Any sequence for separation of solid and liquids may be used.

In view of the foregoing disclosures, variations and modifications thereof will be apparent to one skilled in the art, and it is intended to include within the invention all such variations and modifications except as do not come within the scope of the appended claims.

What is claimed is:

1. The process for recovering a lactam from a mixture thereof with concentrated sulfuric acid which comprises treating the mixture with anhydrous ammonia in the presence of a large excess of liquid anhydrous ammonia, separating from the resulting mixture a solid ammonium sulfate phase and a lactam rich liquid phase, separating ammonia from the latter and recycling ammonia to the treating step.

2. A process of claim 1 wherein the lactam is caprolactam and the amount of ammonia is such that the mixture is readily flowable.

3. A process of claim 2 wherein the initial lactam is mixed with 100% sulfuric acid.

4. A process of claim 3 wherein the solid ammonium sulfate is given wash whereby the lactam content thereof is brought within the maximum of 0.5%.

5. A process of claim 4 wherein an ammonia wash is used and the wash containing caprolactam is recycled to the treating step.

6. A process of claim 2 wherein the amount of recycled ammonia is at least 2 times that required to neutralize the acid.

7. A process of claim 6 wherein the amount of ammonia is about 7 times that required to neutralize the acid.

8. A process of claim 4 wherein the water wash is used and at least a part of the wash liquor is recycled to the treating step.

9. A process of claim 2 wherein the initial lactam mixture contains 5% oleum.

10. A process of claim 1 wherein the reaction temperature is controlled by boiling ammonia from the reaction mixture.

References Cited in the file of this patent

UNITED STATES PATENTS 2,605,261    Kahr                 July 29, 1952

FOREIGN PATENTS 458,387    Italy                 July 10, 1950
667,075    Great Britain        Feb. 27, 1952